(12) United States Patent
Carberg et al.

(10) Patent No.: US 6,938,405 B2
(45) Date of Patent: Sep. 6, 2005

(54) SPRAY NOZZLE GRID CONFIGURATION FOR GAS TURBINE INLET MISTING SYSTEM

(75) Inventors: William George Carberg, Saratoga Springs, NY (US); Richard Robert Trewin, Niskayuna, NY (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 10/705,871

(22) Filed: Nov. 13, 2003

(65) Prior Publication Data

US 2005/0102995 A1 May 19, 2005

(51) Int. Cl.⁷ .............................. F02C 7/00; F02G 1/00; F02G 3/00
(52) U.S. Cl. .......................... 60/39.53; 239/61; 60/728; 60/39.3
(58) Field of Search ............................... 60/39.3, 39.53, 60/39.59, 728; 261/26, 27, 37, 67, 128, 129, 130, 131, 135, 137, 78.2, 116; 239/61

(56) References Cited

U.S. PATENT DOCUMENTS

| | | | |
|---|---|---|---|
| 5,271,873 A | * | 12/1993 | Nelson et al. ............... 261/116 |
| 5,463,873 A | | 11/1995 | Early et al. |
| 5,525,268 A | | 6/1996 | Reens |
| 6,017,384 A | * | 1/2000 | Risse ........................... 96/244 |
| 6,412,291 B1 | * | 7/2002 | Erickson ........................ 62/87 |
| 6,446,440 B1 | | 9/2002 | Ranasinghe et al. |
| 6,478,289 B1 | | 11/2002 | Trewin |
| 6,553,768 B1 | * | 4/2003 | Trewin et al. ................ 60/772 |
| 6,598,401 B1 | * | 7/2003 | Utamura ...................... 60/775 |
| 6,609,360 B2 | * | 8/2003 | Utamura .................. 60/39.092 |
| 6,634,165 B2 | * | 10/2003 | Tomlinson et al. .......... 60/39.3 |
| 6,637,185 B2 | * | 10/2003 | Hatamiya et al. .......... 60/39.53 |
| 6,718,750 B2 | * | 4/2004 | Shibata et al. ........... 60/39.511 |
| 6,779,332 B2 | * | 8/2004 | Horii et al. .................. 60/39.3 |
| 2002/0112465 A1 | * | 8/2002 | Payling et al. ............. 60/39.53 |
| 2004/0050055 A1 | * | 3/2004 | Vidusek et al. ............... 60/728 |
| 2004/0103637 A1 | * | 6/2004 | Maisotsenko et al. ...... 60/39.59 |

* cited by examiner

*Primary Examiner*—William H. Rodriguez
(74) *Attorney, Agent, or Firm*—Nixon & Vanderhye, P.C./G.E.

(57) ABSTRACT

The mister includes a plurality of manifolds extending between opposite sides of a duct. Each manifold carries a plurality of nozzles at laterally spaced positions along the length of the manifold. The manifolds are spaced one behind the other in the direction of air flow in the duct and the pipes connecting the nozzles of the intermediate and upstream manifolds bypass the downstream manifolds to provide the nozzles in a common plane perpendicular to the direction of air flow in the duct. This arrangement affords a uniformity of spray and, hence, a uniformity of humidified air to the inlet of the compressor.

10 Claims, 4 Drawing Sheets

SPRAY NOZZLE GRID CONFIGURATION FOR GAS TURBINE INLET MISTING SYSTEM

BACKGROUND OF THE INVENTION

The present invention relates to a spray nozzle grid configuration forming part of a misting system for humidifying air supplied to the inlet of a compressor for a turbine and particularly relates to a grid system for reducing obstruction to the flow of air in the inlet duct to the compressor while simultaneously affording substantially uniform distribution of the humidified air across the duct.

It is well known in gas turbine operation, that turbine output decreases in proportion to increases in ambient air temperature. However, gas turbine operators frequently encounter peak power generating requirements at elevated ambient temperatures, e.g., due to high air conditioning loads in major cities. It is economical and advantageous to generate additional power through auxiliary systems during those peak power demand periods. One auxiliary system for increasing power input is an inlet misting or fogging system which provides a direct spray of water into the inlet duct which, through an evaporative process, lowers the air temperature to the gas turbine and, hence, increases output.

Compressor inlet misting systems generally attempt to match the spray of water into the inlet duct to the evaporation potential of the air flowing to the gas turbine. Since ambient temperature conditions are variable, a variable spray of water and substantial turndown of the water spray are required. Existing misting systems employ multiple grids each having a substantial number of nozzles to spray the water into the inlet duct. However, as the water supply is turned down, the spray pattern in the inlet duct becomes much less uniform, resulting in less evaporation and more water carryover. Water carryover, e.g., large droplets of water, entering the compressor have the potential to erode the initial compressor stage. Additionally, the air flow is disrupted by the nozzles and ancillary piping in the inlet duct, resulting in reduced evaporation. These disruptions oftentimes disadvantageously form vortices in the flow downstream of the manifold tubes. Consequently, there is a need for a misting system which would provide a substantially uniform water spray into the gas turbine compressor at lower than full demand conditions with minimal obstruction to flow and generation of vortices which can disadvantageously cause droplet coalescence in the nozzle water spray plumes.

BRIEF DESCRIPTION OF THE INVENTION

In accordance with a preferred embodiment of the present invention, there is provided a water misting system for the inlet duct of a compressor for a gas turbine which affords a uniformity of water spray at less than maximum water supply conditions without substantial interference to the spray by the water supply manifolds and nozzle array in the duct. Particularly, the mister apparatus includes a plurality of manifolds extending between opposite walls of the compressor inlet duct and connected to a series of headers which supply water to the manifolds. The manifolds, preferably three manifolds, are arranged between opposite walls of the duct, one behind the other, in the direction of flow. Each of the manifolds includes a plurality of nozzles spaced one from the other along the manifolds. Thus, a first set of a plurality of nozzles extend in a downstream direction from the downstream manifolds. A second set of the plurality of nozzles extend downstream from the manifolds arrayed between the opposite walls and intermediate an array of upstream manifolds and the downstream manifolds. A third set of a plurality of nozzles extend downstream from the upstream manifolds. The first, second and third sets of nozzles of the downstream, intermediate and upstream manifolds, respectively, terminate substantially in a common plane across the duct, the common plane extending generally perpendicular to the direction of air flow. The nozzles of the first, second and third sets are arranged in groups of three nozzles each, with one nozzle from each downstream, intermediate and upstream manifold forming part of each group of three nozzles. The groups of nozzles are spaced between opposite walls of the duct and from one another in a lateral direction relative to the direction of the air flow.

As a consequence of the foregoing described arrangement, the nozzles lie flush with one another in the common plane between opposite walls of the duct. The nozzles therefore do not interfere with one another and the nozzle plumes are not interfered with by other nozzles or manifolds. A uniformity of water spray is thus achieved without an increase in water droplet carryover to the compressor. The nozzles and manifolds are arranged such that a turndown of one of the manifolds in each group of three manifolds still provides for substantial uniformity of the spray pattern in the duct. Additionally, the location of the nozzles in the duct preferably corresponds to the location of the most uniform air flow within the duct. It has been found that by extending the duct between the inlet duct silencer and the mister and before the downturn or elbow to the compressor inlet, a more uniform flow of humidified air is provided.

In a preferred embodiment according to the present invention, there is provided a water mister apparatus for supplying humidified air to a compressor forming part of a gas turbine, comprising an air inlet duct for supplying air to the compressor, a plurality of manifolds arranged in the air inlet duct for communication with a supply of water and extending between opposite walls of the duct, in spaced arrays thereof in a direction of air flow through the duct to the compressor, manifolds of each array thereof lying in substantial alignment with manifolds of other arrays thereof in the direction of air flow through the duct to the compressor, a plurality of nozzles in communication with each of the manifolds, a first set of the plurality of nozzles extending in a downstream direction from a downstream array of manifolds, a second set of the plurality of nozzles extending in a downstream direction from manifolds of the plurality thereof arrayed intermediate an array of upstream manifolds of the plurality thereof and the downstream array of manifolds, a third set of the plurality of nozzles extending in a downstream direction from the upstream array of manifolds, the first, second and third sets of nozzles of the downstream, intermediate and upstream arrays of manifolds, respectively, terminating substantially in a common plane extending across the duct and generally normal to the direction of air flow through the duct.

In a further preferred embodiment according to the present invention, there is provided a water mister apparatus for supplying humidified air to a compressor forming part of a gas turbine, comprising an air inlet duct for supplying air to the compressor, a plurality of manifolds arranged in the air inlet duct for communication with a mister supply and extending between opposite walls of the duct in downstream, intermediate and upstream arrays thereof spaced from one another in a direction of air flow through the duct to the compressor, each array having a plurality of the manifolds spaced one from the other and lying generally in a common plane generally perpendicular to the direction of air flow, manifolds of each array thereof lying in substantial alignment with the manifolds of other arrays thereof in the direction of air flow, a plurality of nozzles in communication with each of the manifolds, a first set of the plurality of nozzles extending in a downstream direction from the downstream array of manifolds, a second set of the plurality of nozzles extending in a downstream direction from the intermediate array of manifolds, a third set of the plurality of nozzles extending in a downstream direction from the upstream array of manifolds, the first, second and third sets of nozzles of the downstream, intermediate and upstream arrays of manifolds, respectively, terminating substantially in a common plane extending across the duct and generally normal to the direction of air flow through the duct.

DETAILED DESCRIPTION OF THE INVENTION

Figure 1:
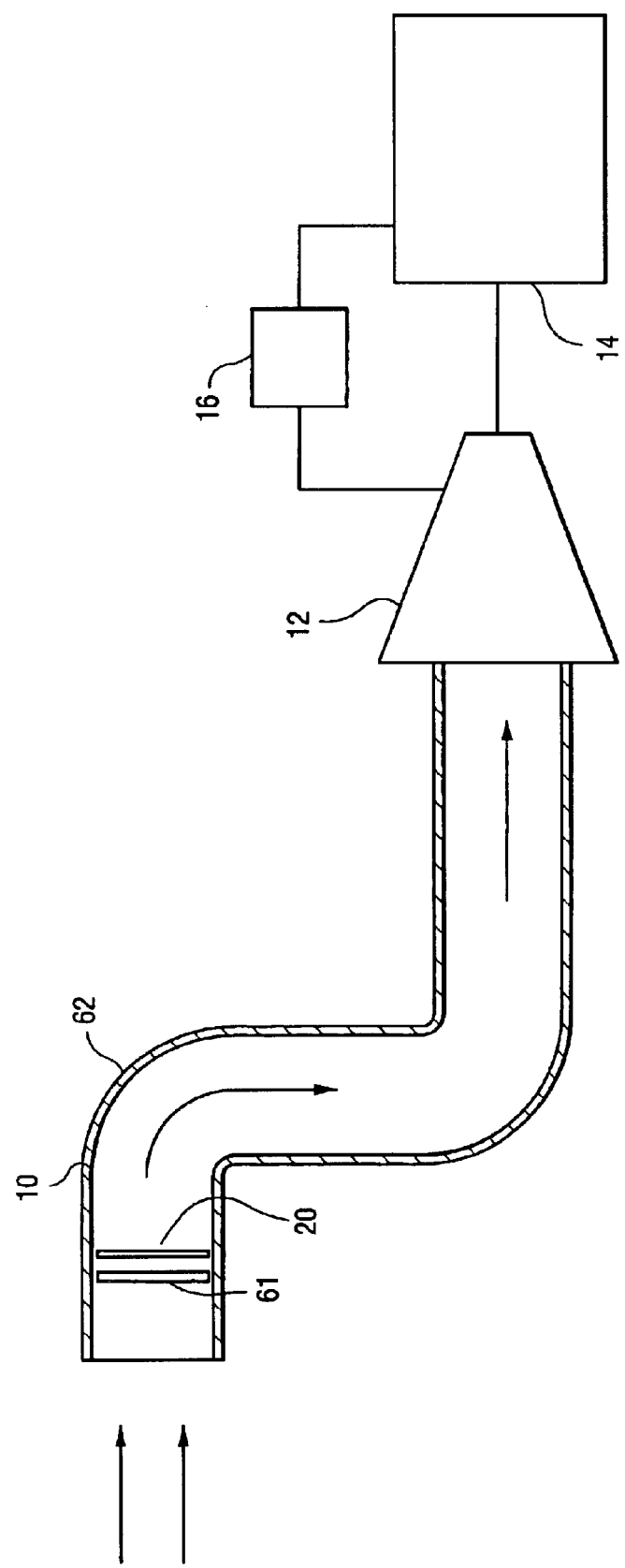
FIG. 1 is a diagrammatic illustration of a mister arranged in an air inlet duct to a compressor for a turbine.

Referring to FIG. 1, there is illustrated an inlet duct 10 for supplying ambient air to the inlet of a compressor 12 driven by a turbine 14. Combustors 16 are illustrated utilizing a portion of the compressed air for combustion and flowing the products of combustion into the turbine 14 to drive the latter and the compressor. As noted previously, gas turbine output decreases in proportion to increase in the ambient air temperature and, accordingly, a mister apparatus, generally designated 20, is disposed in the inlet duct 10 to provide a direct water spray evaporative cooling system, thereby to increase gas turbine output.

Figure 2:
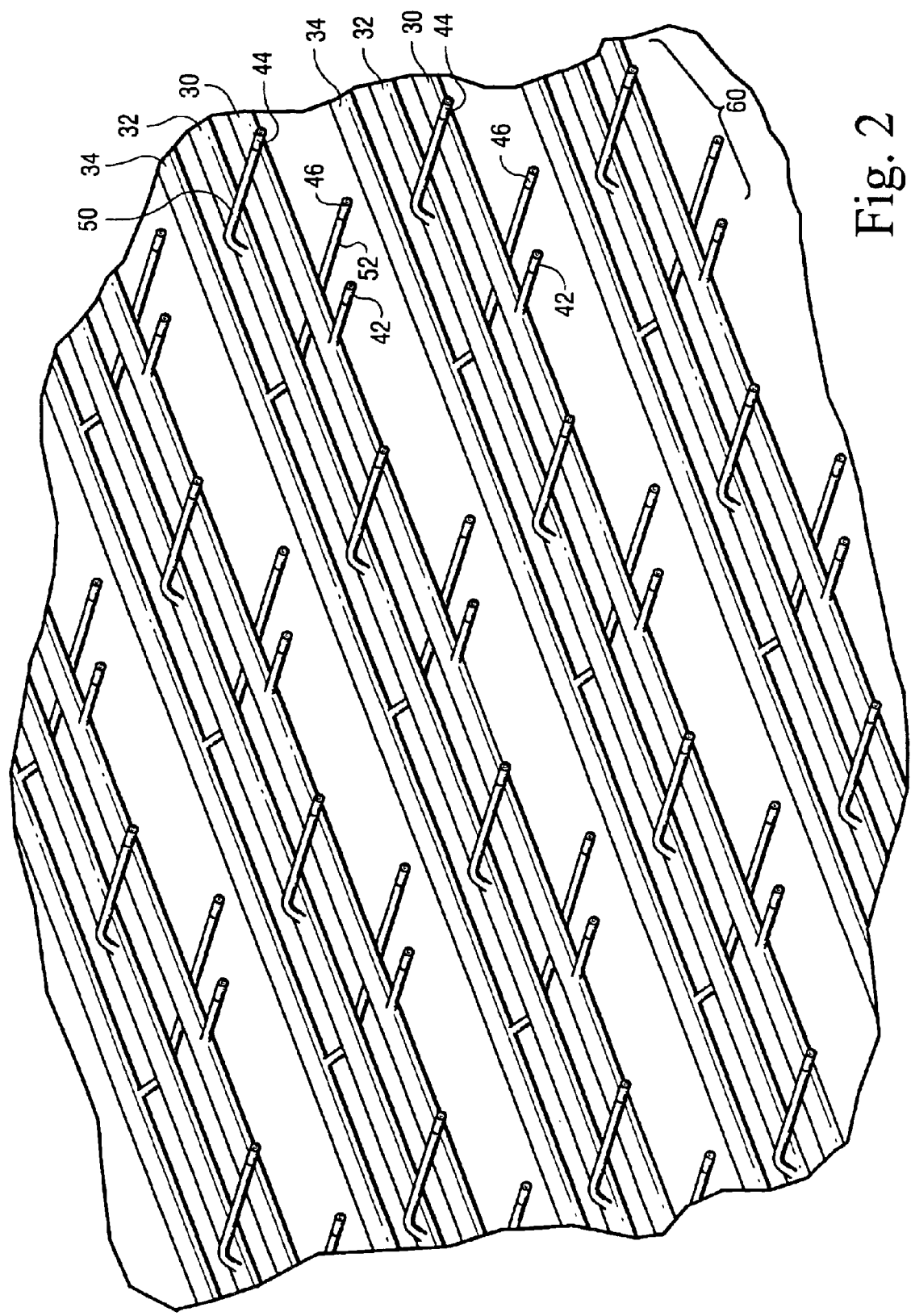
FIG. 2 is a fragmentary enlarged perspective view of a grid illustrating an array of manifolds and nozzles in the grid forming part of the mister according to a preferred embodiment of the present invention.
Figure 3:
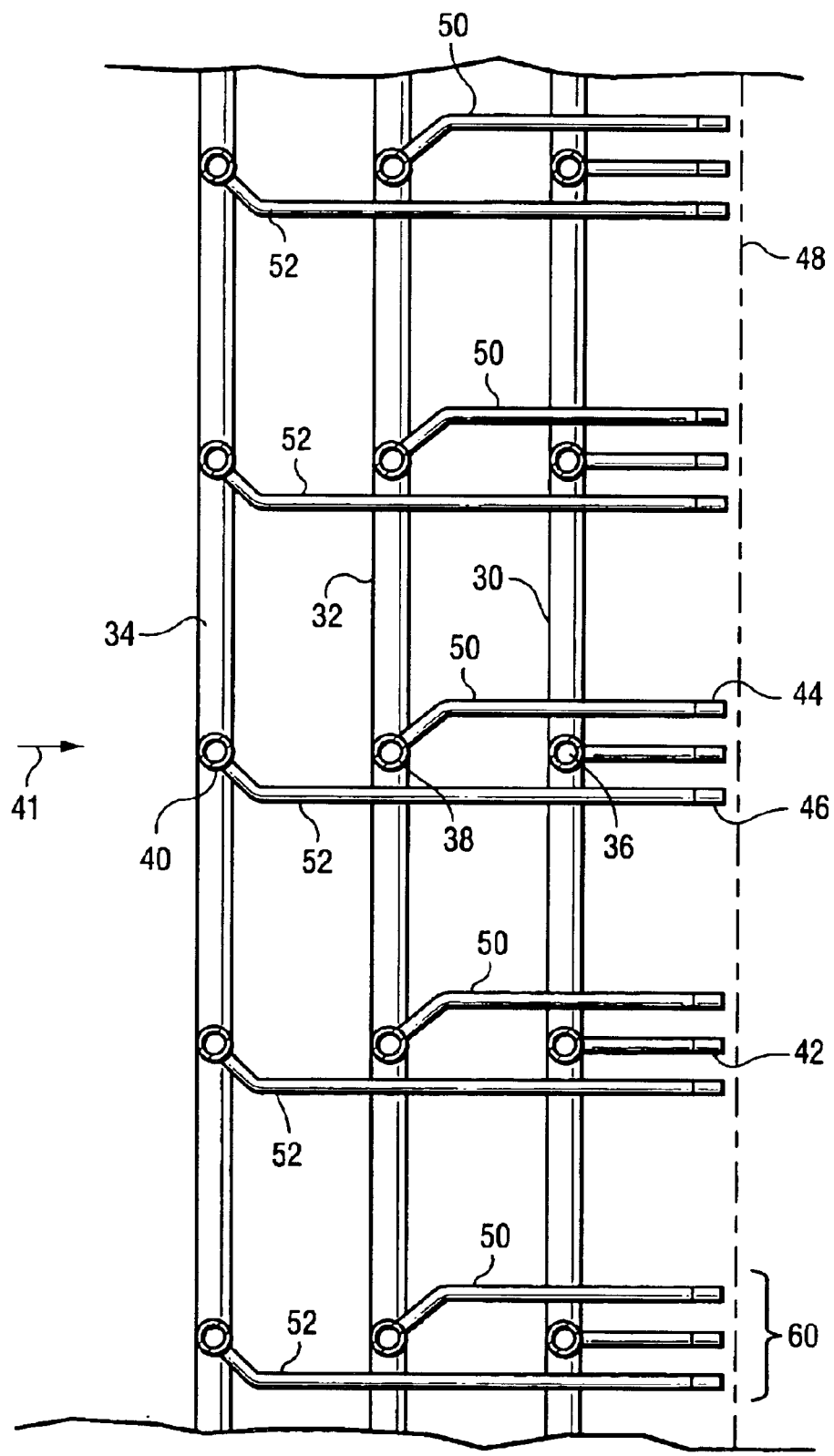
FIG. 3 is a fragmentary side cross-sectional view illustrating the manifolds and headers, together with the nozzles extending from the manifolds, as viewed along a vertical section through the duct.
Figure 4:
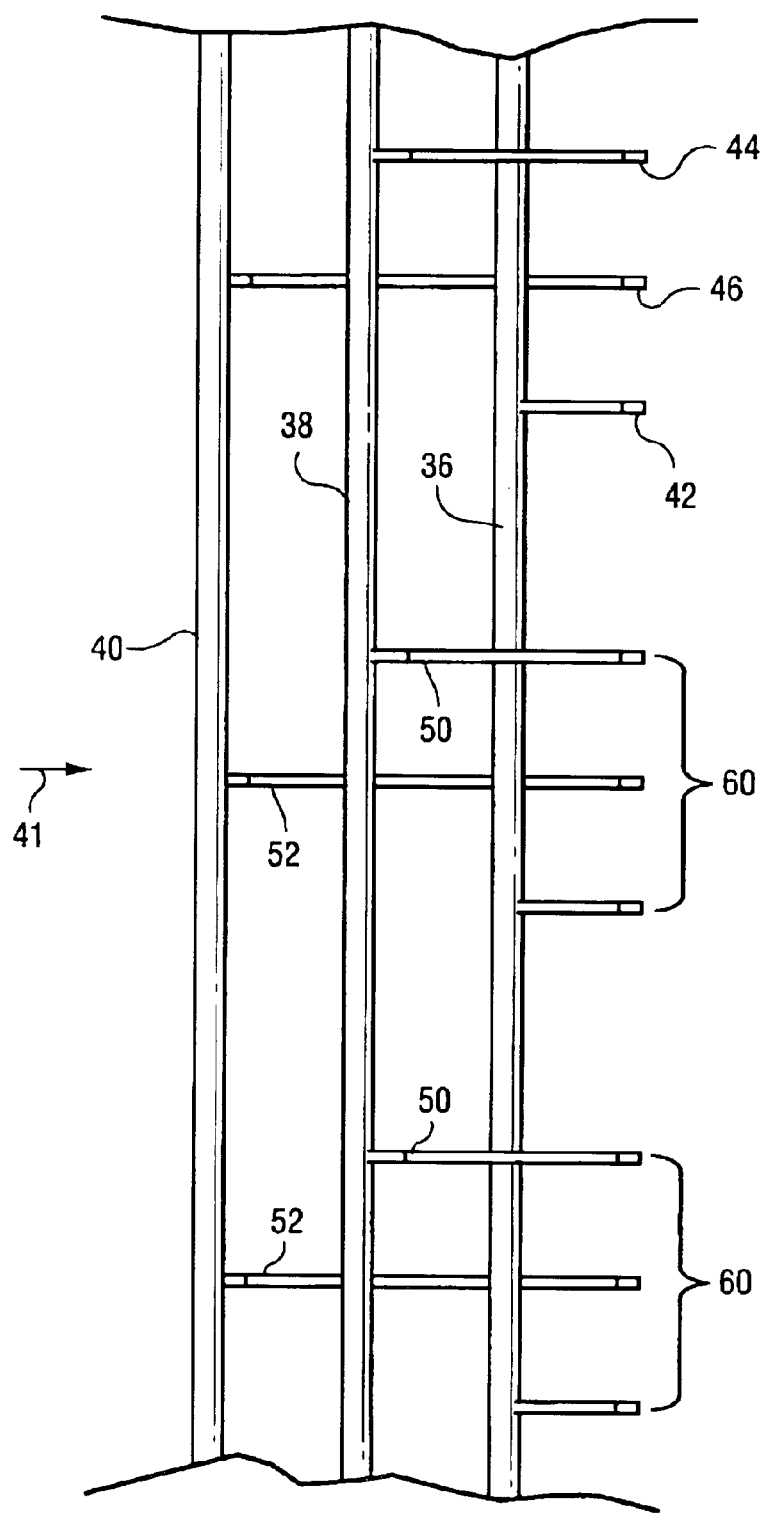
FIG. 4 is a top plan view of the mister grid within a duct.

Referring now to FIGS. 2 and 3, the mister apparatus includes an array of nozzles for spraying water in the duct 10 for evaporation and humidification of the air inlet to the compressor 12. As illustrated in FIG. 3, a series of headers 30, 32 and 34 along one or both sides of the duct supply water to a series of manifolds 36, 38 and 40, extending from the headers and generally laterally between opposite side walls of the duct. Thus, as illustrated, a first set of laterally extending manifolds 36 vertically spaced one from the other extends between opposite walls of the duct on a downstream side of the mister. A second set of laterally extending manifolds 38 are vertically spaced one from the other and likewise extend between opposite sides of the duct. The second set of manifolds 38 are disposed between the downstream manifolds 36 and a third set of upstream manifolds 40. Upstream manifolds 40 extend laterally and are spaced vertically one from the other between opposite sides of the duct. The direction of air flow through the duct is illustrated by the arrow designated 41.

Each of the manifolds 36, 38, 40 includes a plurality of nozzles. For example, the first or downstream manifolds 36 each carry a plurality of nozzles 42 which extend from the manifold in a downstream direction parallel to the direction of the air flow. Similarly, each of the intermediate or second manifolds 38 carry a plurality of nozzles 44 at laterally spaced locations and which nozzles 44 likewise extend from the manifold in a downstream direction and in the direction of the air flow. The upstream or third manifolds 40 likewise carry a plurality of nozzles 46 at spaced lateral positions therealong and which nozzles 46 extend in a downstream direction in the direction of air flow. The nozzles 42, 44 and 46 thus constitute first, second and third sets, respectively, of plural nozzles extending in a downstream direction from respective manifolds 36, 38 and 40. As illustrated in FIG. 3, the nozzles 42, 44 and 46 terminate substantially in a common plane designated 48 extending across the duct and generally perpendicular to the direction of air flow through the duct 10.

As illustrated in both FIGS. 2 and 3, the nozzles 44 are carried by pipes 50 from the respective manifolds 38 which pipes 50 are vertically offset from the downstream manifolds 36. Likewise, the nozzles 46 of the upstream manifolds 34 are carried by pipes 52 which extend along the vertically opposite sides of the intermediate and downstream manifolds 38 and 36, respectively, enabling the nozzles 42, 44 and 46 to lie in the common plane 48. It will be appreciated that the nozzles 42, 44 and 46 have a spray plume, e.g., a conical plume. With the arrangement of the nozzles as described, it will also be appreciated that the spray plumes do not interfere with one another and are not interfered by either the adjacent nozzles or manifolds.

From a review of FIGS. 2 and 3, the nozzles 42, 44 and 46 are preferably arranged in groups of three nozzles each, with the groups thereof being spaced from one another across the duct 10 between its opposite side walls. The nozzles 42 and 44 are spaced equal distances from the center nozzle 46 of each group. Groups 60 of three nozzles each are spaced laterally in the direction of the manifolds from one another a distance from centerline to centerline of the groups at least and preferably four times the distance between laterally adjacent nozzles of each group. That is, as illustrated in FIG. 2, the distance along the manifolds between the center nozzles 46 of adjacent groups is at least four times the distance along the manifolds between the nozzles 42, 46 or 44, 46 of each group. The groups 60 of nozzles 42, 44 and 46 are also preferably in vertical registration with one another although such vertically spaced groups of nozzles may be laterally offset. In this manner, the groups of nozzles are spaced relative to one another to provide a substantially uniform distribution of water in the air inlet duct and without forming vortices resulting from interference between the nozzle spray plumes and adjacent nozzles or the manifolds.

Referring back to FIG. 1, the mister apparatus 20 is preferably located in the portion of the inlet housing which corresponds to the location of the most uniform air flow within the duct 10. It has been found that by locating an extra length of inlet duct between the silencer 61 and the elbow 62 or downcomer to the turbine, that a substantial uniformity of flow can be obtained. By locating the mister apparatus in the area of uniform flow, a uniformity of humidified flow is likewise obtained. It will also be appreciated that the number of nozzles in a mister apparatus as in the present invention may, for example, comprise on the order of nine hundred or more nozzles in a single grid. Additionally, the nozzles are preferably of a swirl type where the nozzle plume is not only conical in shape but swirls about an axis generally parallel to the direction of flow through the duct.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Water mister apparatus for supplying humidified air to a compressor forming part of a gas turbine, comprising:

an air inlet duct for supplying air to the compressor;

a plurality of manifolds arranged in the air inlet duct for communication with a supply of water and extending in a direction generally normal to the direction of air flow through the duct to the compressor, said manifolds extending between opposite walls of the duct and in spaced arrays thereof in the direction of air flow through the duct to the compressor, manifolds of each array thereof lying in substantial alignment with manifolds of other arrays thereof in the direction of air flow through the duct to the compressor;

a plurality of nozzles in communication with each of the manifolds;

a first set of said plurality of nozzles extending in a downstream direction from a downstream array of manifolds;

a second set of said plurality of nozzles extending in a downstream direction from manifolds of said plurality thereof arrayed intermediate an array of upstream manifolds of said plurality thereof and said downstream array of manifolds;

a third set of said plurality of nozzles extending in a downstream direction from said upstream array of manifolds;

said first, second and third sets of nozzles of said downstream, intermediate and upstream arrays of manifolds, respectively, terminating substantially in a common plane extending across said duct and generally normal to the direction of air flow through the duct.

2. Apparatus according to claim 1 wherein at least one set of said second and third sets of nozzles extends from a corresponding one of said intermediate and upstream manifolds, bypassing said downstream manifolds in a downstream direction.

3. Apparatus according to claim 1 wherein said second set of nozzles extends from said intermediate array of manifolds along one side of and bypasses downstream manifolds of said downstream array thereof, said third set of nozzles extending from said upstream manifolds along an opposite side of said downstream manifolds.

4. Apparatus according to claim 1 wherein the nozzles of the first, second and third sets thereof are arranged in groups of three nozzles each with the three nozzles of each group being carried by aligned manifolds of the respective arrays thereof, the groups of nozzles being spaced across the duct from one another.

5. Apparatus according to claim 4 wherein said second set of nozzles extends from said intermediate array of manifolds along one side of and bypasses downstream manifolds of said downstream array thereof, and said third set of nozzles extends from said upstream manifolds along an opposite side of said manifolds of said downstream array thereof.

6. Water mister apparatus for supplying humidified air to a compressor forming part of a gas turbine, comprising:

an air inlet duct for supplying air to the compressor;

a plurality of manifolds arranged in the air inlet duct for communication with a mister supply and extending in a direction generally normal to the direction of air flow through the duct to the compressor, said manifolds extending between opposite walls of the duct and in downstream, intermediate and upstream arrays thereof spaced from one another in the direction of air flow through the duct to the compressor, each array having a plurality of said manifolds spaced one from the other and lying generally in a common plane generally perpendicular to the direction of air flow, manifolds of each array thereof lying in substantial alignment with the manifolds of other arrays thereof in the direction of air flow;

a plurality of nozzles in communication with each of the manifolds;

a first set of said plurality of nozzles extending in a downstream direction from said downstream array of manifolds;

a second set of said plurality of nozzles extending in a downstream direction from said intermediate array of manifolds;

a third set of said plurality of nozzles extending in a downstream direction from said upstream array of manifolds;

said first, second and third sets of nozzles of said downstream, intermediate and upstream arrays of manifolds, respectively, terminating substantially in a common plane extending across said duct and generally normal to the direction of air flow through the duct.

7. Apparatus according to claim 6 wherein at least one set of said second and third sets of nozzles extends from a corresponding one of said intermediate and upstream manifolds aligned with said downstream manifolds, respectively, and bypassing said downstream manifolds in a downstream direction.

8. Apparatus according to claim 6 wherein said second set of nozzles extends from said intermediate manifolds along one side of and bypasses downstream manifolds, said third set of nozzles extending from said upstream manifolds along an opposite side of said downstream manifolds.

9. Apparatus according to claim 6 wherein the nozzles of the first, second and third sets thereof are arranged in groups of three nozzles each with the three nozzles of each group being carried by aligned manifolds of the respective arrays thereof, the groups of nozzles being spaced across the duct from one another.

10. Apparatus according to claim 9 wherein said second set of nozzles extends from said intermediate array of manifolds along one side of and bypasses downstream manifolds of said downstream array thereof, and said third set of nozzles extends from said upstream manifolds along an opposite side of said manifolds of said downstream array thereof.

* * * * *